(12) United States Patent
Saliba

(10) Patent No.: US 11,036,714 B2
(45) Date of Patent: *Jun. 15, 2021

(54) SYSTEMS AND METHODS FOR LOCATING APPLICATION SPECIFIC DATA

(71) Applicant: Magnet Forensics Investco Inc., Waterloo (CA)

(72) Inventor: Jad John Saliba, Puslinch (CA)

(73) Assignee: Magnet Forensics Investco Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,013

(22) Filed: Oct. 30, 2015

(65) Prior Publication Data

US 2016/0048555 A1 Feb. 18, 2016

Related U.S. Application Data

(63) Continuation of application No. 13/711,902, filed on Dec. 12, 2012, now Pat. No. 9,177,011.

(Continued)

(51) Int. Cl.
*G06F 16/00* (2019.01)
*G06F 7/00* (2006.01)
(Continued)

(52) U.S. Cl.
CPC ........ *G06F 16/2365* (2019.01); *G06F 16/245* (2019.01); *G06F 16/9535* (2019.01);
(Continued)

(58) Field of Classification Search
CPC . G06F 16/2365; G06F 16/245; G06F 16/9535
(Continued)

(56) References Cited

U.S. PATENT DOCUMENTS 7,885,944 B1 2/2011 Bruening
8,108,370 B1 * 1/2012 Bruening ................ G06F 16/33
707/697

(Continued)

OTHER PUBLICATIONS

"Understanding and Creating BladeTM Data Recovery Profiles" [online]. Dated Jun. 3, 2010. URL:<http://www.digital-detective.net/understanding-and-creating-blade-data-recovery-profiles/>.*

(Continued)

*Primary Examiner* — Raquel Perez-Arroyo
(74) *Attorney, Agent, or Firm* — Bereskin & Parr LLP/S.E.N.C.R.L, s.r.l.

(57) ABSTRACT

A system and a method for locating application-specific data that has been previously deleted and located in an address of the data storage device marked as being available for storing new data. The method includes accessing unidentified data from at least one data storage device; examining the unidentified data to detect at least one application-specific data pattern associated with at least one application; for each detected application-specific data pattern, executing an application-specific validation process to determine whether the unidentified data includes valid data associated with a corresponding application; and if it is determined that the unidentified data includes valid data associated with the corresponding application, then recovering the valid data.

18 Claims, 13 Drawing Sheets

Related U.S. Application Data

(60) Provisional application No. 61/579,325, filed on Dec. 22, 2011.

(51) Int. Cl.

| | | |
|---|---|---|
| *G06F 16/23* | (2019.01) | |
| *G06F 16/245* | (2019.01) | |
| *G06F 16/9535* | (2019.01) | |
| *G06F 21/57* | (2013.01) | |
| *G06F 21/64* | (2013.01) | |
| *G06F 21/78* | (2013.01) | |
| *H04L 29/06* | (2006.01) | |
| *G06Q 10/10* | (2012.01) | |
| *G06Q 50/00* | (2012.01) | |

(52) U.S. Cl.
CPC .............. *G06F 21/57* (2013.01); *G06F 21/64* (2013.01); *G06F 21/78* (2013.01); *G06Q 10/10* (2013.01); *G06Q 50/01* (2013.01); *H04L 63/308* (2013.01)

(58) Field of Classification Search
USPC .......................................................... 707/691
See application file for complete search history.

(56) References Cited

U.S. PATENT DOCUMENTS

| | | | | |
|---|---|---|---|---|
| 8,140,906 B1* | 3/2012 | Searls | ................. | G06F 11/1469 714/36 |
| 2007/0112921 A1* | 5/2007 | Lunt | ................... | G06Q 10/107 709/206 |
| 2007/0118607 A1 | 5/2007 | Nelissen | | |
| 2008/0256139 A1* | 10/2008 | Jessee | ................. | G06F 11/1435 |
| 2010/0095064 A1* | 4/2010 | Aviles | ................. | H04L 67/1097 711/118 |
| 2010/0274218 A1* | 10/2010 | Yodfat | ................ | A61M 5/1413 604/504 |
| 2010/0306179 A1 | 12/2010 | Lim | | |
| 2010/0312863 A1* | 12/2010 | Mohr | ................. | H04L 41/0813 709/220 |
| 2012/0017000 A1* | 1/2012 | Lim | .................... | H04L 63/1425 709/229 |
| 2012/0084261 A1* | 4/2012 | Parab | ................. | G06F 11/1458 707/654 |

OTHER PUBLICATIONS

Digital Detective Group, "NetAnalysis User Manual v1.53", <http://www.digital-detective.co.uk/documents/NetAnalysis-v1.53-Manual.pdf>, retrieved Nov. 28, 2013.

Garfinkel, "Carving contiguous and fragmented files with fast object validation", Digital Investigation, 4S (2007) S2-S12, Elsevier, Jul. 24, 2014.

Document relating to EP Application No. 12198571.7, dated Jul. 8, 2014 (Response).

Document relating to EP Application No. 12198571.7, dated Dec. 9, 2013 (European Search Report).

Office Action re: Canadian Application No. 2,798,824, dated Sep. 25, 2019, 7 pages.

* cited by examiner

FIG. 11

SYSTEMS AND METHODS FOR LOCATING APPLICATION SPECIFIC DATA

RELATED APPLICATIONS

This application is a continuation of U.S. application Ser. No. 13/711,902, (now U.S. Pat. No. 9,177,011) filed on Dec. 12, 2012 and entitled "Systems and Methods for Locating Application-Specific Data", which claims the benefit of U.S. Provisional Patent Application Ser. No. 61/579,325 filed on Dec. 22, 2011 and entitled: "Systems and Methods for Locating Application-Specific Data", the entire contents of all application which are hereby incorporated by reference herein for all purposes.

TECHNICAL FIELD

The embodiments herein relate to systems and methods for locating application-specific data, and in particular to systems and methods for locating application-specific data stored on a data storage device, for example on a hard drive on a personal computer or a laptop.

INTRODUCTION

With the advent of the computer technology and the Internet, many people spend large amount of time using their computers for many different reasons. For example, users may use computers to access social networks, communicate with other people using email or chat applications, conduct online shopping, process digital photography, research information and so on.

Generally, applications on a computer will create application-specific user data associated with one or more users interacting with the application. For example, if a user is using an online chat program, there may be a chat history indicating contents of one or more chats between the user and various other communication partners. Similarly, an online shopping experience may leave trails of what the user had bought or looked at in information stored in cookies associated with various shopping web sites.

For various reasons, a user may attempt to hide, delete, or obfuscate some such information so that this information may not be readily accessible to someone else. This may be particularly the case where the user is undertaking some illicit or otherwise improper activity and does not want to be caught.

In some cases, it may be desirable for a party to know how the computer had been used by a given individual or a group of individuals. For example, law enforcement authorities may be interested to learn about a suspect's activity on a particular computer. Similarly, employers may be interested to learn how their computer resources are being used by their employees. Similarly, parents and spouses might be interested to know how their children and their partners are using a computer.

SUMMARY

According to some aspects there is provided a computer-implemented method for locating application-specific data, the method comprising including accessing unidentified data from at least one data storage device; examining the unidentified data to detect at least one application-specific data pattern associated with at least one application; for each detected application-specific data pattern, executing an application-specific validation process on a portion of the unidentified data located near that application-specific data pattern to determine whether that portion of unidentified data is valid data associated with the corresponding application; and if it is determined that the portion of the unidentified data is valid data associated with the corresponding application, then recovering that portion of the unidentified data.

In some cases, the unidentified data is located in a portion of the data storage device indicated as unallocated.

In some cases, the unidentified data located in the portion of the data storage device indicated as unallocated is deleted data.

In some cases, the application-specific data pattern includes at least one user identifier for the at least one application associated with at least one user.

In some cases, the at least one user identifier is obtained from user identifiers located in the data storage device that are associated with one or more other applications.

In some cases, the application-specific validation process includes comparing the portion of the unidentified data located near that application-specific data pattern against selected date ranges to filter out invalid data.

In some cases, the application-specific validation process includes determining how much of the portion of the unidentified data includes unacceptable characters to determine whether that portion is valid data.

In some cases, the method further includes providing a strictness level indicative of the tolerable amount of unacceptable characters in the portion of the identified data to determine that portion of data as valid data.

In some cases, the application-specific validation process includes checking for presence of data fields associated with the corresponding application in the portion of the unidentified data.

In some cases, the method further comprises checking whether the data fields contain non-readable characters to determine whether the portion of the unidentified data is valid.

In some cases, the application-specific validation process includes checking data surrounding the portion of the unidentified data to determine that that portion of data is not associated with another application.

In some cases, the method further includes providing a number of options to select one or more applications to search for data associated therewith.

In some cases, the method further includes searching at selected locations on the data storage device for application-specific data.

In some cases, the method further includes generating a report indicative of the application-specific data located.

In some cases, the application-specific validation process includes semantic error checking.

In some cases, the computer-executable instructions for the method are stored in a second data storage device when the method is being executed such that these instructions do not overwrite the unidentified data in the data storage device.

In some cases, the method further includes outputting the valid data to a second data storage device such that the valid data do not overwrite the unidentified data in the data storage device.

According to some other aspects, there is provided a system for locating for application-specific data comprising at least one data storage device, having unidentified data stored therein; at least one processor operatively coupled to the at least one data storage device. The at least one processor is configured to access the unidentified data from the at least one data storage device, examine the unidentified data for occurrence of one or more application-specific patterns of data associated with one or more applications; for each occurrence of the application-specific pattern of data, execute an application-specific validation process on a portion of candidate data located near that occurrence to determine whether that candidate data is valid data associated with the application, and recover the valid data if it is so determined.

BRIEF DESCRIPTION OF THE DRAWINGS

Some embodiments will now be described, by way of example only, with reference to the following drawings, in which:

FIG. 11 is another exemplary screen of the interface;

DESCRIPTION OF SOME EMBODIMENTS

Figure 1:
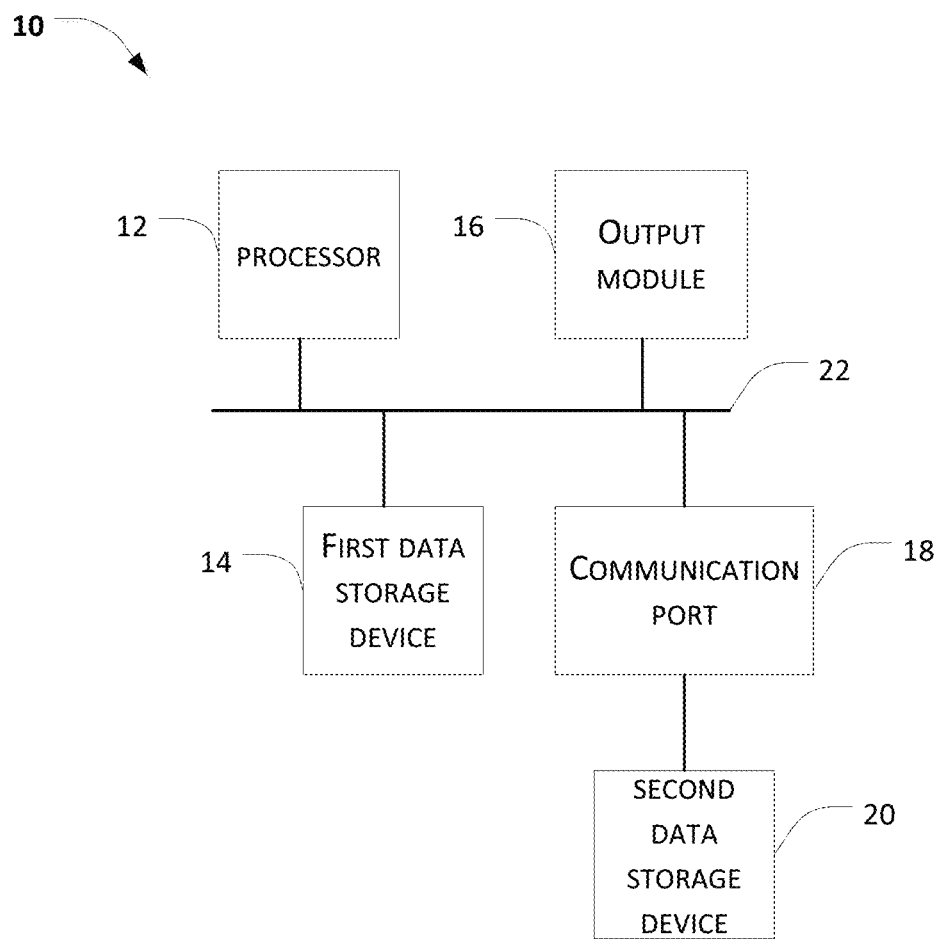
FIG. 1 is a schematic diagram illustrating a system for locating application-specific data in a data storage device.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Referring now to FIG. 1, illustrated therein is a system 10 for locating application-specific data according to some embodiments. The system 10 includes a processor 12, a first data storage device 14, an output module 16, a communication port 18 and a second data storage device 20 coupled to the communication port 20. In this embodiment, the various components 12, 14, 16, 18 of the system 10 are operatively coupled using a system bus 22.

The system 10 may be various electronic devices such as personal computers, networked computers, portable computers, portable electronic devices, personal digital assistants, laptops, desktops, mobile phones, smart phones, tablets, and so on.

In some examples, the first data storage device 14 may be a hard disk drive, a solid-state drive or any other form of suitable data storage device and/or memory that may be used in various electronic devices. The data storage device 14 may have various application-specific user data associated with various applications stored thereon. The application-specific data may be generated when the user is interacting with one or more applications.

The applications that may have application-specific data associated therewith, for example, may include various instant chat messaging applications provided by various online social networks, email clients which may be located locally or accessed using an online interface, peer-to-peer file sharing applications, various web based applications such as social networks, websites, and so on.

In many cases, some of the data associated with these applications may be deleted automatically. In some cases the data may be deleted upon command from the user using the application. For example, many internet browser applications may delete browsing history automatically after a certain period of time (e.g. 1 hr, 24 hr, 1 week, 1 month). Similarly, in some cases cached data may be deleted for various websites automatically. The browser applications may also provide the user with an option to delete cache data or browsing history. However, when such data is deleted, the deleted data may not in fact physically be deleted from the data storage device 14 as explained below.

In particular, many operating systems and/or device driver software may not physically delete the data from the data storage device 14 immediately when a command to delete such data is received. Instead, the addresses on the data storage device 14 that stores such data may simply be marked as "unallocated" or "available". Such indications inform the operating system or other applications that these addresses are now available to store other data. The old data may subsequently be overwritten and thereby deleted when there are new data stored in such addresses.

Accordingly, it is possible that the data flagged to be deleted may remain physically undeleted from the data storage device 14 for an extended period of time even though it had been requested to be deleted by the application or the user (or both).

It may be desirable to locate application-specific user data in the data storage device 14 even after such data has "deleted" (but not physically deleted from the data storage device 14).

In the embodiment as shown, another data storage device in addition to the first data storage device 14, namely the second data storage device 20, is provided. The second data storage device 20 may be used to store computer-executable instructions that can be executed by the processor 12 to configure the processor 12 to locate application-specific user data in the data storage device 14.

It should be noted that it is not necessary to provide a second data storage device, and in other embodiments, the instructions may be stored in the first data storage device 14 or any other data storage device. However, it may be desirable for the instructions to be stored in a data storage device other than the data storage device 14 such that any "deleted" data stored thereon will not be unintentionally overwritten by the computer-executable instructions to configure the processor 12.

The processor 12 may be configured to provide a user interface to the output module 16. The output module 16, for example, may be a suitable display device (e.g. a monitor) coupled to the processor 12. The user interface allows the processor 12 to solicit input from a user regarding various types of searches to be performed to locate the application-specific user data. The user interface, for example, may include exemplary screens of the user interface 30 as illustrated in FIGS. 2-11.

Figure 2:
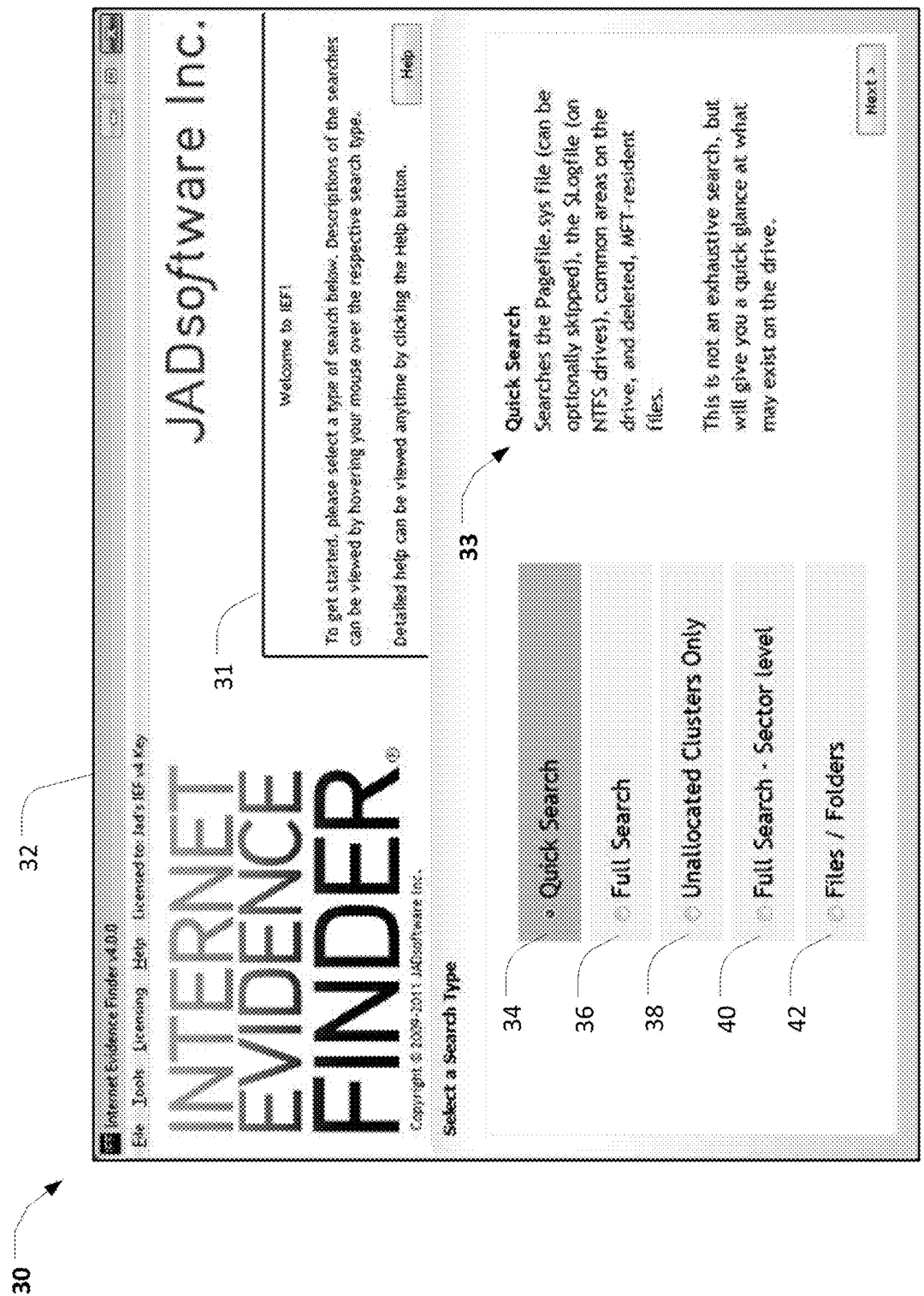
FIG. 2 is an exemplary screen of an exemplary interface that may be provided by the processor shown in FIG. 1.

Referring now to FIG. 2, illustrated therein is a screen 32 of an exemplary interface 30 provided by the processor 12. The interface allows the user to choose between five different types of searches. The screen 32 also includes a first information area 31 where information related to the interface is provided. The screen 32 also includes a second information area 33 where information about various searches may be displayed.

Various types of searches that can be performed may include a quick search 34. The quick search 34 is generally configured so that it can be executed quickly but not all relevant data stored in the data storage device 14 may be located by the search. The quick search 34, in some examples, will perform the search for application-specific data at common folder and/or file locations, the pagefile.sys file, a filesystem file called $Logfile, and files that are stored in the Master File Table (MFT). This allows the quick search to focus on locations where relevant data may be usually found. However, any application-specific data stored in other locations that are not searched will not be located by the quick search 34

In other cases, a full search 36 may be performed. The full search 36 is normally more comprehensive than the quick search 34 and for example may search all areas of a hard drive that may contain application-specific user data. The full search 36, in some examples, searches all the areas the quick search 34 searches, and in addition searches Volume Shadow Copy files, the hiberfil.sys file, unallocated/free space, and/or file "slack" space.

In some cases, another type of search 38 limited to unallocated clusters may be performed. This search 38 may only search those locations in the data storage device 14 that are identified as unallocated or free. This may recover data that had been marked as "deleted" but has not yet been physically deleted from the data storage device 14. This search 38 also searches file "slack" space, which essentially is unused, unallocated space at the end of a file.

In some other cases, a full sector-level search 40 at the sector level may be performed. When conducting the full sector-level search 40, the processor 12 may be configured to conduct a search at the sector level without any reference to the file system. In some cases, the data storage device 14 stores data in blocks of predetermined size called "sectors". The full sector-level search 40 searches the data stored in the data storage device on a sector-by-sector basis without regards to how the data may be logically connected at higher levels. For example, the search may read the raw data from every sector on the device, starting at the first sector, and ending at the last sector. The entire storage device is read by reading the raw data at the sector level, instead of reading individual files.

In some cases, a file/folder search 42 that is limited to specified locations may be performed. In such cases, only the files and/or folders specified by the user will be searched.

In some embodiments, the user may select one of the search options 34, 36, 38, 40, or 42 to proceed with the search that is selected. In other embodiments, more than one of the options 34, 36, 38, 40, and 42, or other search options may be selected to perform multiple searches.

Figure 3:
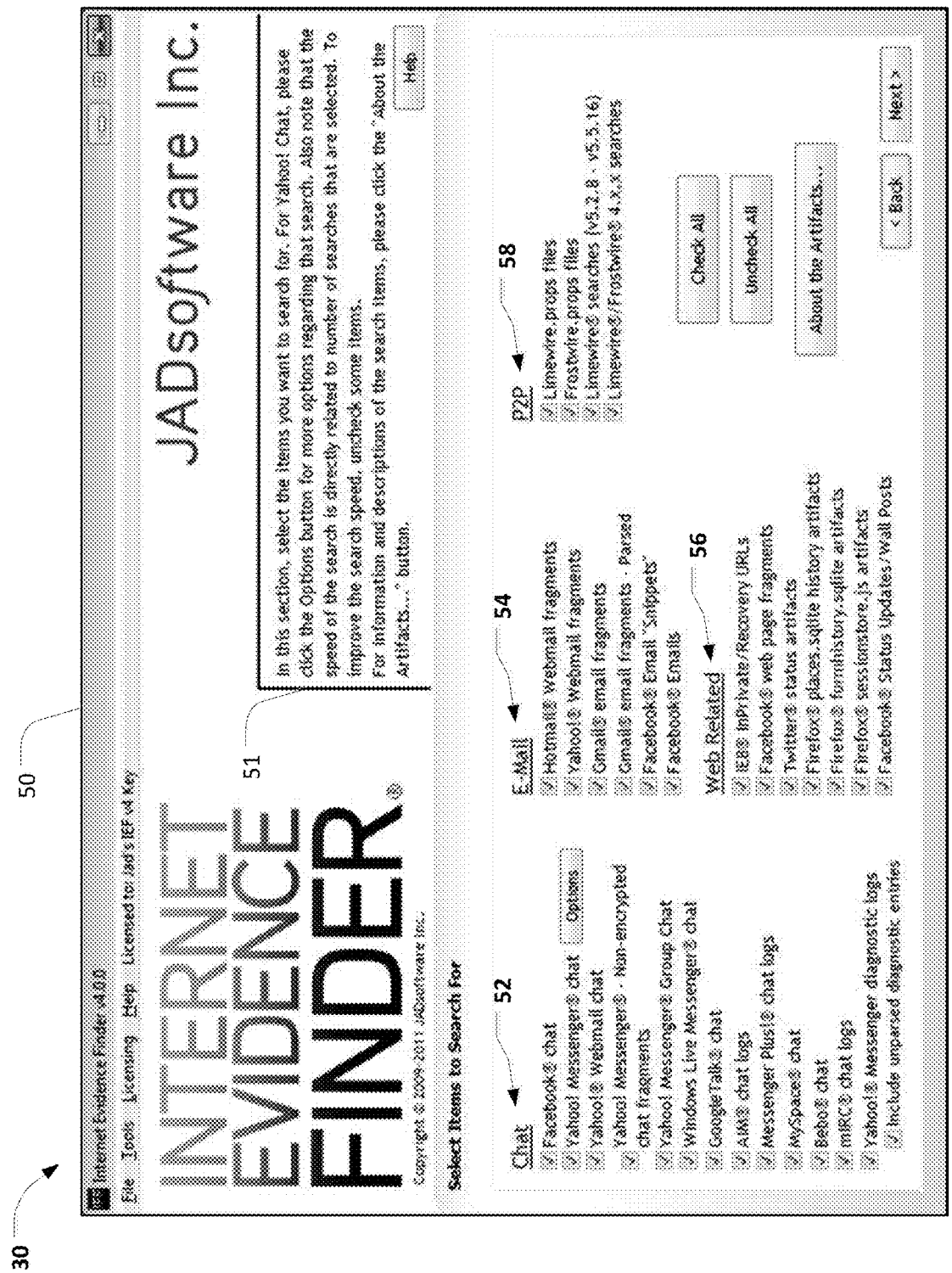
FIG. 3 is another exemplary screen of the interface; that may be provided by the processor shown in FIG. 1.

For example, after selecting the desired search option 34, 36, 38, 40, or 42, the user may be presented with specific applications (e.g. email, chat, online, peer-to-peer, etc.) that the user wishes to search for application-specific data associated. For instance, referring now to FIG. 3, illustrated therein is another exemplary screen 50 of the interface 30 showing various applications that the user may be presented with for searching for application-specific data associated.

As shown, the screen 50 includes information area 51 presenting information about the functions and options that may be selected on the screen 50. The screen 50 allows the user to select specific applications that the user would like to search for application user data. As shown, the user may select one or more of chat applications 52, one or more of email applications 54, one or more of web-related applications 56 and/or one or more of peer-to-peer file sharing applications 58.

Some of the applications 52, 54, 56, 58 may have corresponding client applications in a local computer. In other cases, some of the applications 52, 54, 56, 58 may be web-based and accessible through a web-browser application, or otherwise remotely accessed.

Figure 4:
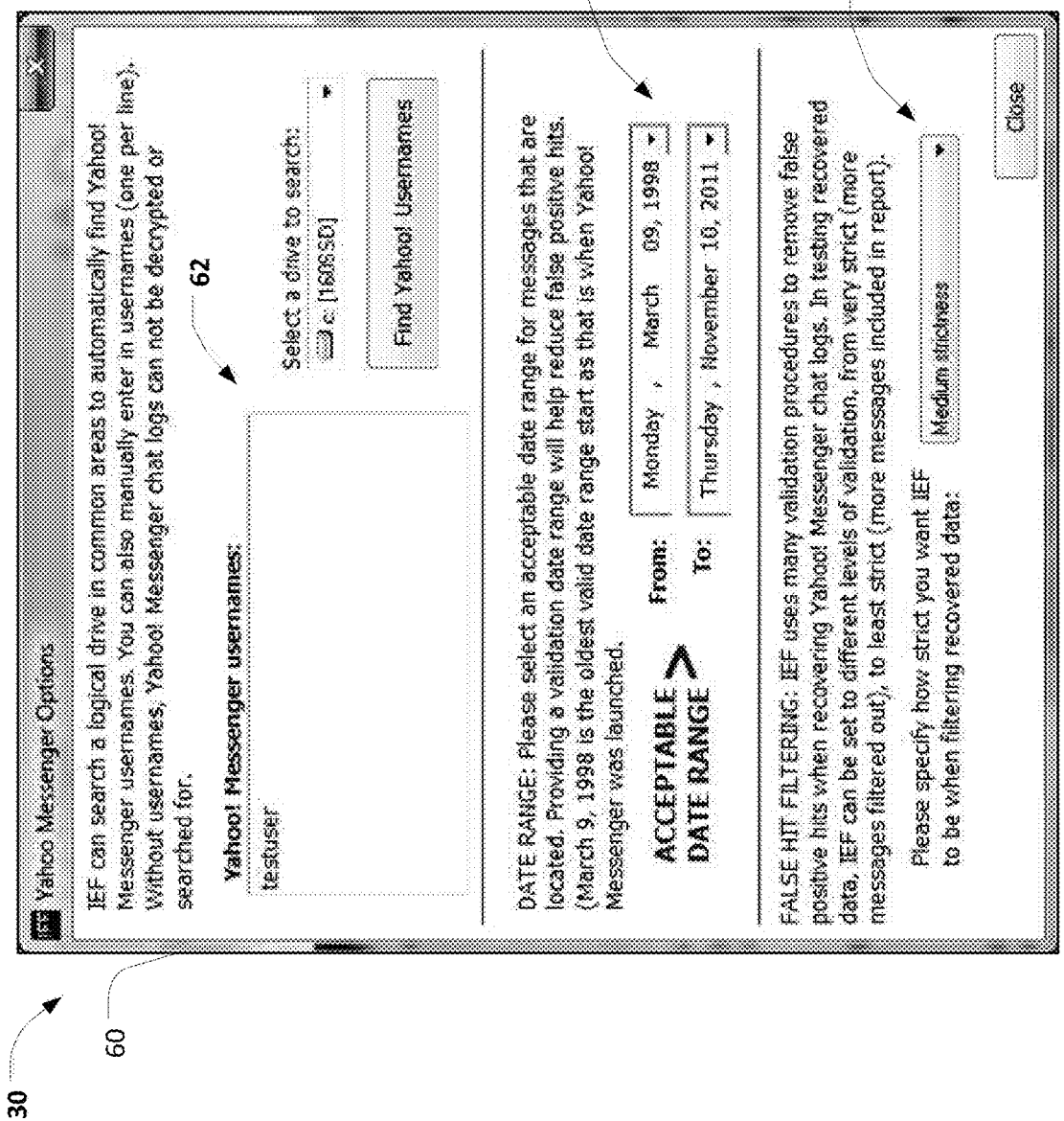
FIG. 4 is another exemplary screen of the interface.

In some embodiments, the processor 12 may be configured to request a user identifier associated with a particular application to search for application-specific data. Referring for example to FIG. 4, illustrated therein is a third screen 60 of the interface 30 that requests one or more user identifiers associated with a chat application.

As shown, a user identifier (e.g. user name "testuser") may be provided to the processor 12 using the textbox 62. The user identifier may be used to decrypt data logs associated with one or more applications. In some embodiments, the processor may automatically generate one or more user identifiers without requiring input from the user. For example, the processor may look for and use one or more user identifiers associated with one or more applications that are stored in the data storage device 14, such as user identifiers for the operating system, other chat applications, and so on.

As shown, the screen 60 also allows the user to input a date range within the date range field 64. The date range field 64 allows the user to modify the search so as to focus the search to a desired range. Specifying a date range may reduce false positives results located by the search. For example, if the computer was first used by the user on Jan. 1, 2009, any results that seem to have a date before Jan. 1, 2009 may be disregarded as being false positives. The processor 12 may also be configured to provide a default date, for example, whatever date the associated application was first used.

The screen 60 also shows a "strictness" setting 66 which may help reduce false positives. The possible settings may include, for example, "Least Strict", "Medium Strictness", and "Most Strict". Generally the higher the strictness setting, the more aggressive the processor 12 will be in filtering out hits that do not appear to be valid. This could be done, for example, by taking the size of the recovered message text and comparing the percentage of that text that is null characters (e.g. hex 0x00).

In some cases, the strictness setting may determine the percentage of null characters of a result that should be accepted as valid.

Generally, the strictness setting allows the user to indicate how much error he/she is willing to tolerate. For example, a high strictness setting may reduce the number of false positives results (i.e. the results located by the search that are not application-specific data), but it also increases the chance of erroneously discarding actual application-specific data. In contrast, a low strictness setting will provide generally more results and reduce the chance of erroneously discarding valid results, but there is a chance that more of the results are false positive results.

Figure 5:
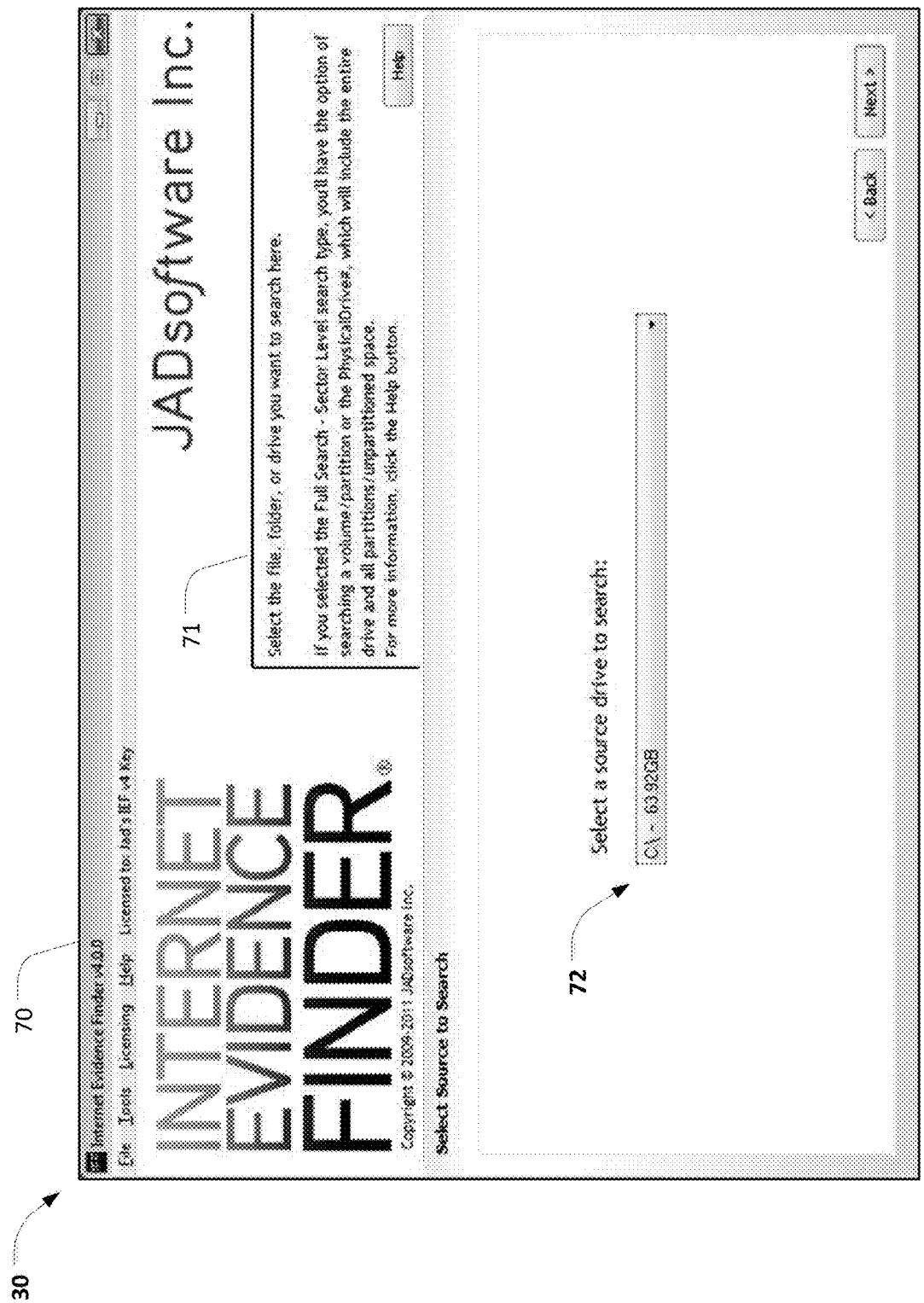
FIG. 5 is another exemplary screen of the interface.

Referring now to FIG. 5, illustrated therein is another exemplary screen 70 of the interface 30 which may be used to indicate a location where the search is to be conducted. The screen 70 includes various locations for the search, which as shown could be presented via a dropdown menu 72. An attached data storage device, for example, the data storage device 14 or 20, or a virtual drive mounted from forensic image files may be presented here.

The screen 70 also includes an information area 71 which provides information about the screen 70. If the Files/Folders search option 42 was selected at the screen 32, options to select particular files or a folder would be presented in the screen 70.

Figure 6:
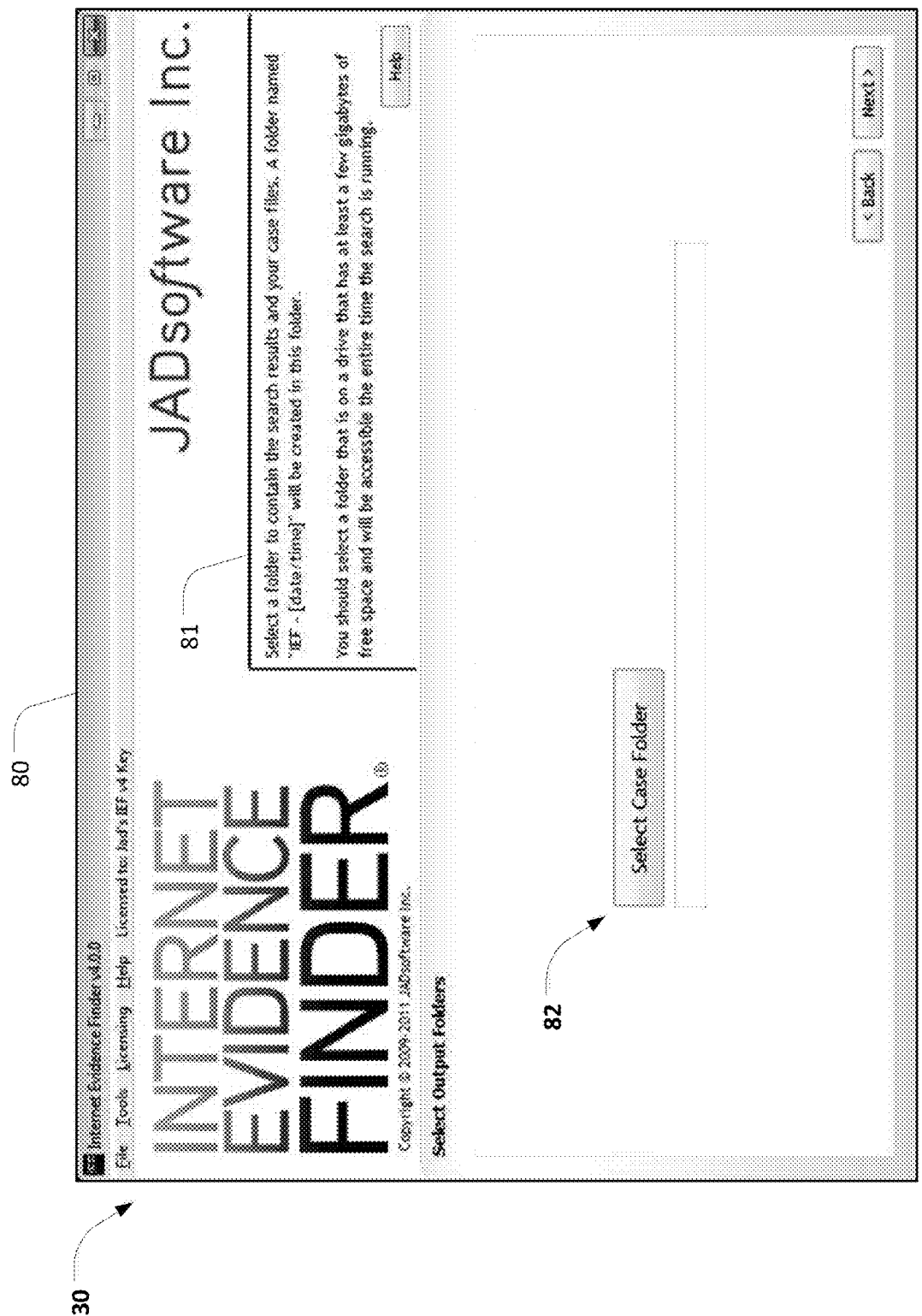
FIG. 6 is another exemplary screen of the interface.

Referring now to FIG. 6, illustrated therein is another exemplary screen 80 of the exemplary interface 30, which may be interacted with to indicate an output location for the results of the search. As shown, the output location, which may be referred to as "The Case Folder" could be indicated using the input field 82. The results located by the search are saved in the case folder. Generally, the case folder should be a location that has sufficient free space (e.g. a few gigabytes or more) and is accessible while the search is being conducted. The screen 80 also includes an information area 81 which provides information about the screen 80.

Figure 7:
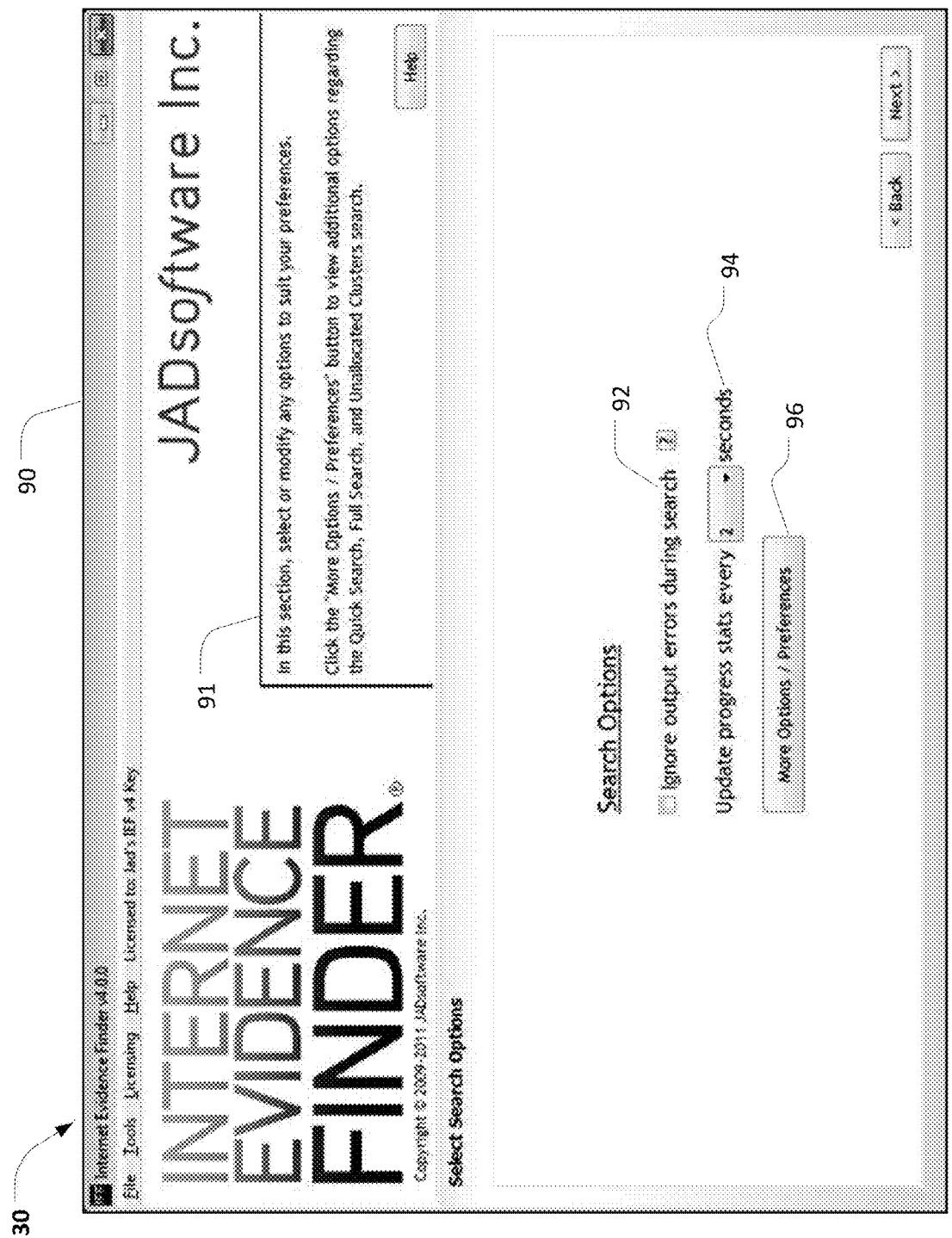
FIG. 7 is another exemplary screen of the interface.

Referring now to FIG. 7, illustrated therein is another exemplary screen 90 of the interface 30, which may be used to configure miscellaneous options associated with the search. The screen 90 includes an information window 91 providing information about the screen 90.

Various miscellaneous search options may be presented by the screen 90. For instance, in the embodiment as shown, an option 92 to ignore output errors during the search is provided. If the option 92 is selected, errors are logged to a log file rather than stopping the search and waiting for input from the user.

The search options provided in the screen 90 also include an option 94 which may be used to indicate time between progress updates. Generally, having more frequent updates provides a more accurate indication of the progress of the search. However, more frequent updates may be less efficient in that some processing cycles for the processor 12 are being used to provide the updates instead of conducting the search, which may slow the overall search process.

Figure 8:
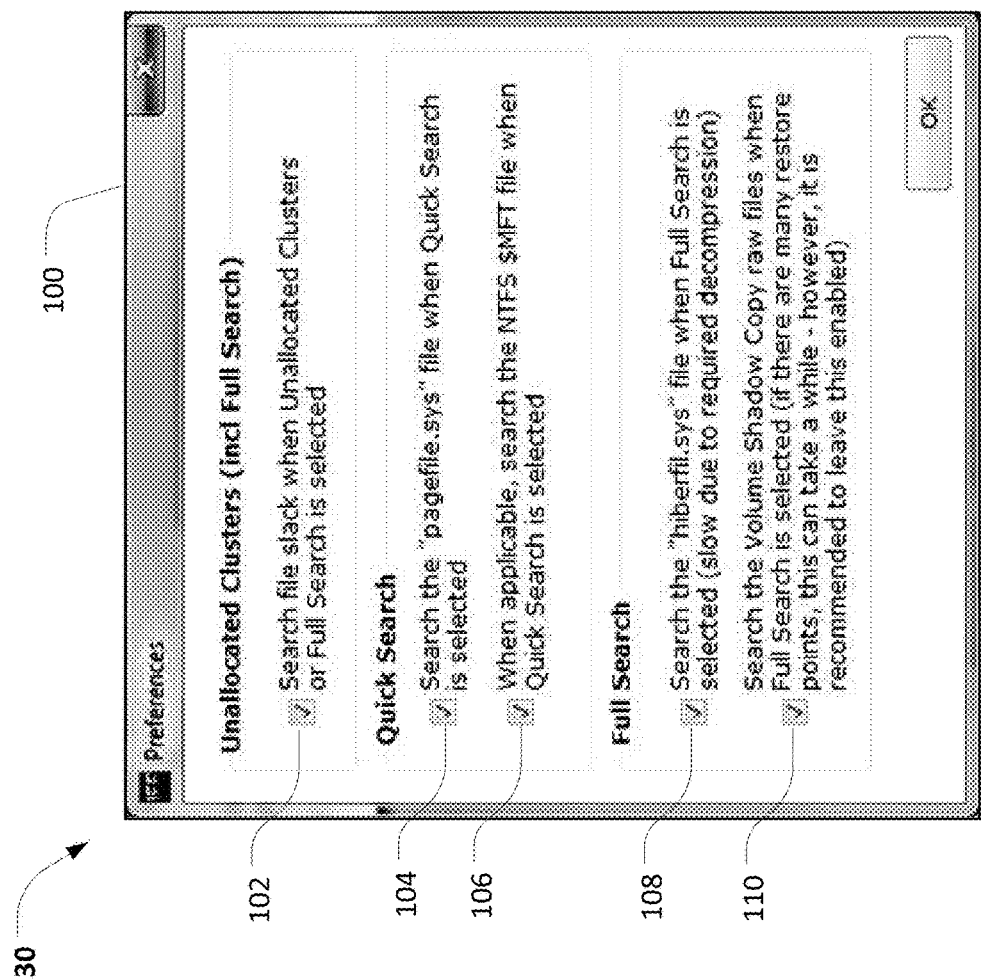
FIG. 8 is another exemplary screen of the interface.

The screen 90 also includes a button 96 which may be used to configure additional search options. Referring now to FIG. 8, illustrated therein is a screen 100 which may be presented when the button 96 is clicked. The screen 100 may display additional search options which may be presented to the user. The additional search options may allow the search to ignore certain files and/or locations depending on which search type was selected. Ignoring certain files and/or locations can help speed up the search if those areas of the data storage device 14 are not important to the user. For example, when the search duration is an important factor, a file such as the "pagefile.sys" file may be ignored by the search to save time.

The screen 100 as shown also includes an option 102 to search file slack (e.g. space left over between the last byte of a file and the first byte of the next cluster, which is a form of internal fragmentation) when the "Unallocated Clusters" option 36 or the "Full Search" option 38 is selected in screen 30 shown in FIG. 2. The file slack is a form of unused or unallocated space. Even though the file slack does not include any content of the file it is associated with, the file slack is not available to or useable by other files. The data in file slack can contain data that was in unallocated space or from a deleted file and can in many cases contain relevant application-specific data.

The screen 100 also includes an option 104 which may be used to indicate whether the search should include one or more particular files (e.g. the "pagefile.sys" file) when the Quick Search option 34 is selected on screen 30 shown in FIG. 2. In particular, the "pagefile.sys" is a file used in Windows operating environments as virtual memory, and can become quite large (in some cases multiple gigabytes in size) and thus can take a long time to search. The "pagefile.sys" file can contain data from memory that would normally not be found in a file or otherwise on the hard drive.

The screen 100 also includes an option 106 which may be used to indicate whether the search should include another file (e.g. the "NTFS $MFT" file) when the Quick Search option 34 is selected on screen 30 shown in FIG. 2. The "NTFS $MFT" file is a master file table for NTFS file systems as used in Windows NT and other subsequent related versions of Windows operating system. This file can also become quite large, which can slow the search process It is recommended to keep this option selected as the Master File Table can contain deleted data not found in unallocated space.

The screen 100 also includes an option 108 which may be used to indicate whether the search should include "hiberfil.sys" file when the Full Search option 36 is selected on screen 30 shown in FIG. 2. Generally, when a machine running the Windows operating system is put into a hibernate state, the RAM is saved to the "hiberfil.sys" file and the machine may then be powered down. As such, this file may be valuable for searching as it may provide a snapshot of user activity that is otherwise not stored (although the file can get quite large thus slowing the search). Moreover, searching the "hiberfil.sys" file for application-specific data may be lengthy because it is necessary to decompress the file prior to searching. This option is also recommended as the "hiberfil.sys" file can contain data not found in the "pagefile.sys" or other areas/files on the hard drive.

The screen 100 also includes an option 110 which may be used to indicate whether the search should include Volume Shadow Copy raw files, which are generally backup copies or snapshots of data for providing consistent backups and avoiding file locking. The Volume Shadow Copy files can contain data that has since been deleted and is longer in the file system, "pagefile.sys" file, or unallocated/file slack space.

In other embodiments, there may be additional search options which can be used to customize the search by the processor 12 for application-specific user data.

Figure 9:
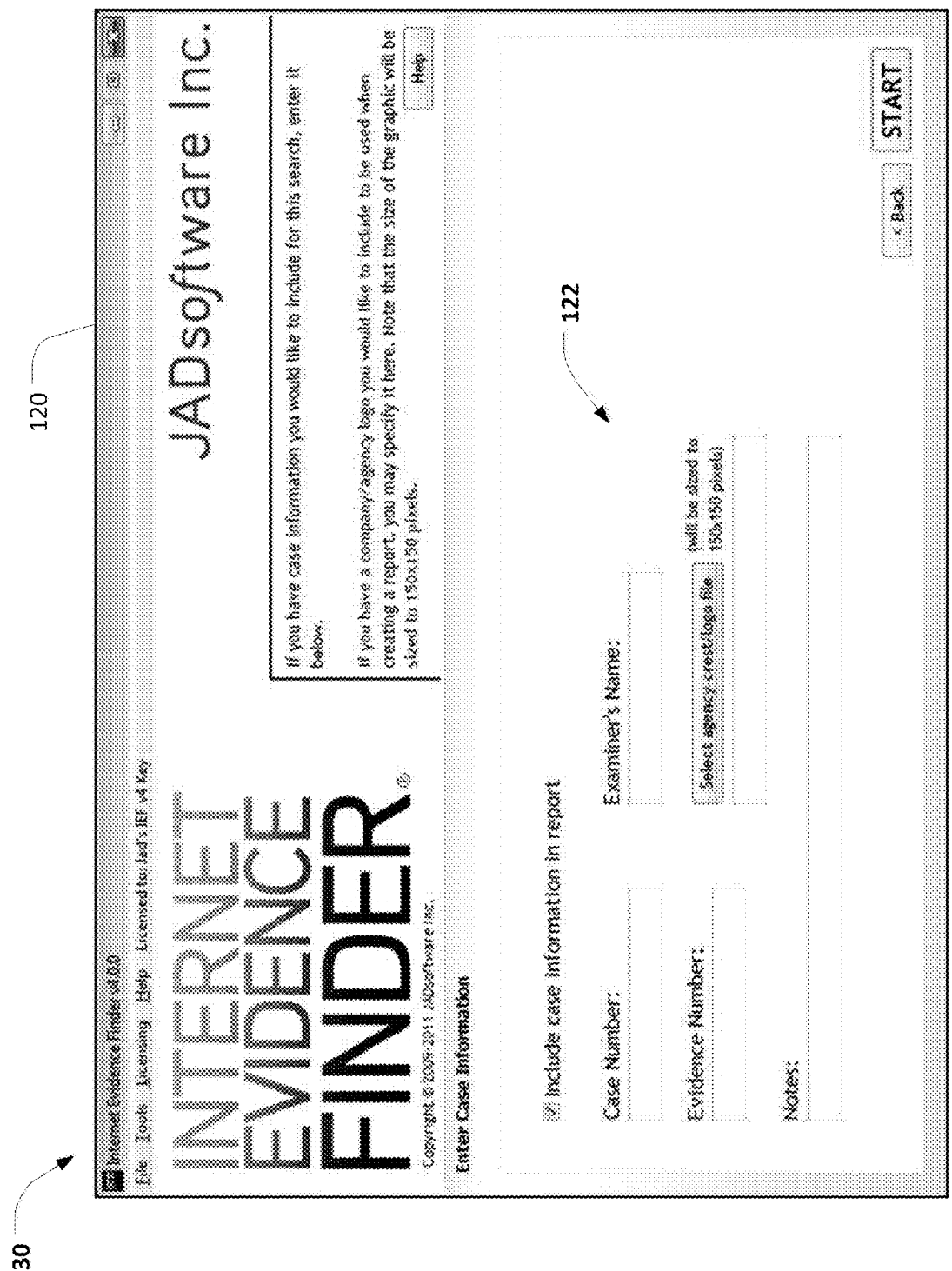
FIG. 9 is another exemplary screen of the interface.

Referring now to FIG. 9, illustrated therein is a screen 120 of the interface 30 which may be used to enter information about the search. As shown, the user screen 120 includes various input areas 122 which may be used to enter information about the search that is being conducted. This information may be presented as part of the report. In some cases, the user may elect not to input any information via the screen 120. The screen 120 also includes an information area 121 where information about the screen 120 is presented.

After various options are selected in various screens of the interface 30, the search for application-specific data may begin. The processor 12 is configured to locate application-specific user data by executing one or more steps of a method 200 for locating application-specific data, which is described in detail further below and illustrated in FIG. 12. In some embodiments, while the search is being executed, the processor 12 may be configured to display intermediate results in a screen.

Figure 10:
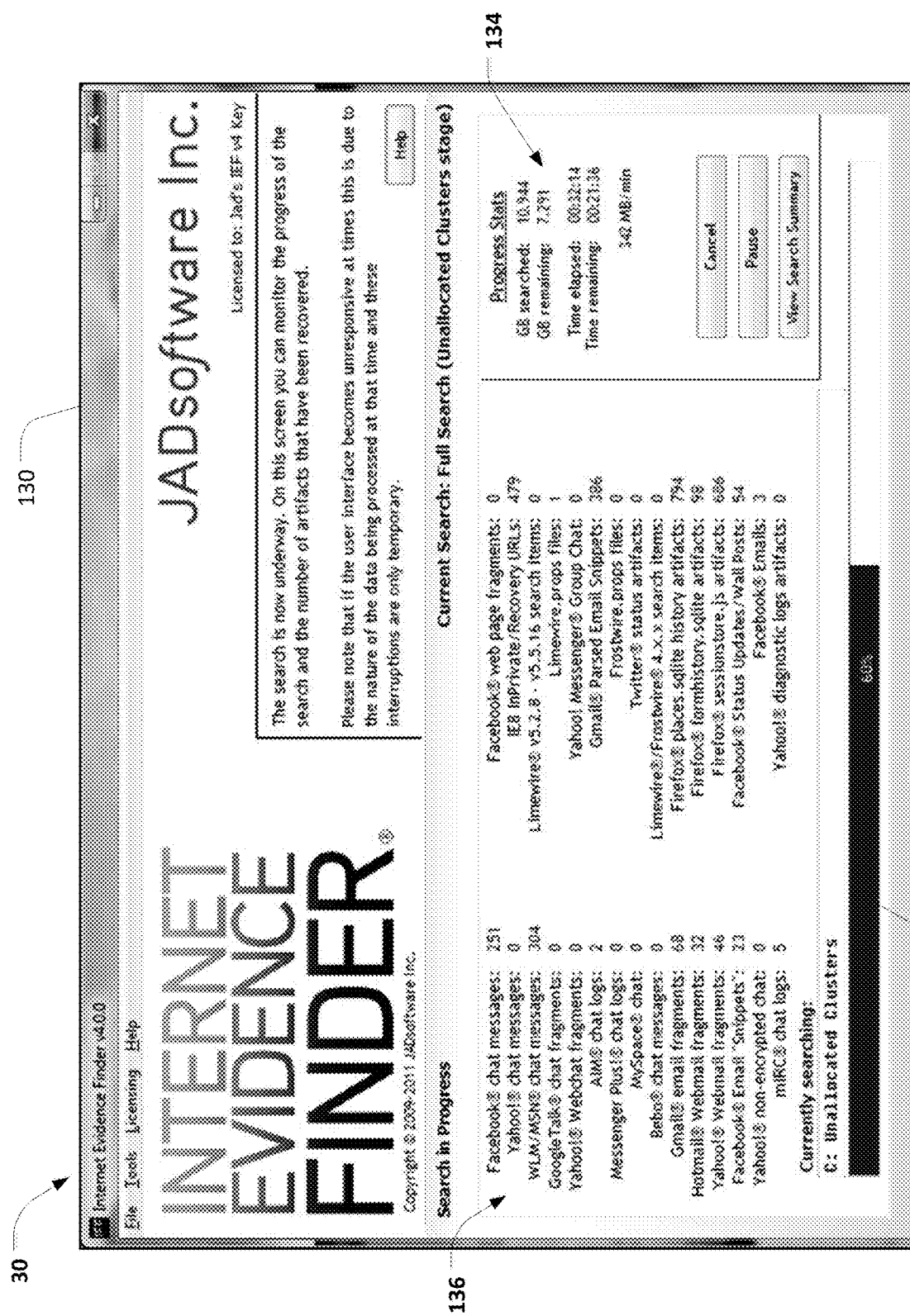
FIG. 10 is another exemplary screen of the interface.

Referring now to FIG. 10, illustrated therein is another exemplary screen 130 of the interface 30 which may be presented when the search is in progress. The screen 130 includes an information area 131 which may be used to provide information about the screen 130.

The screen 130 includes a progress bar 132 which is generally indicative of the progress of the search. In addition to the progress bar 132, progress information area 134 also provides additional information about the progress of the search. The screen 130 also displays a summary of the interim results in the area 136. That is, the area 136 displays an overview of various types of application-specific data that had been located by the search so far.

Figure 11:
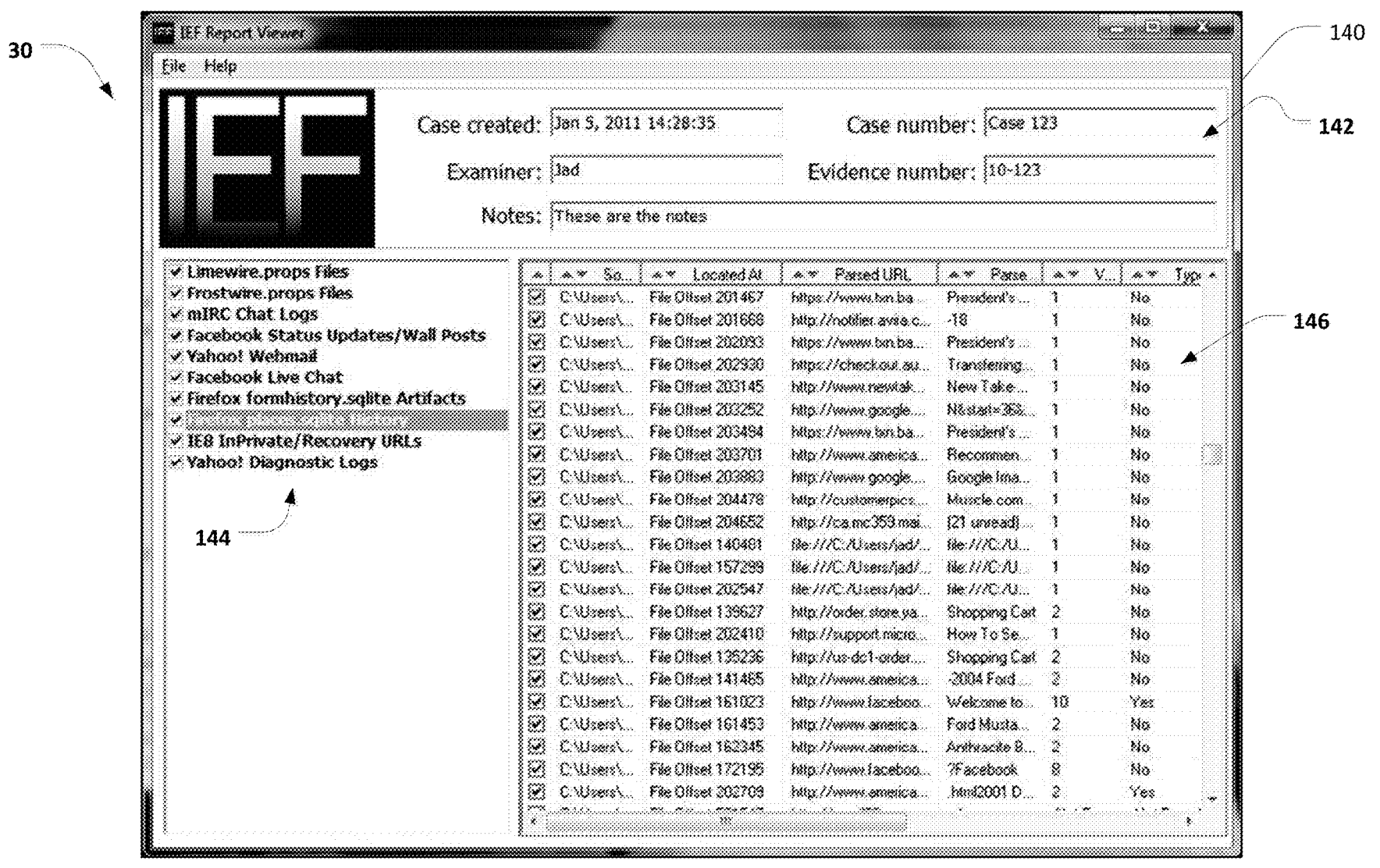

Referring now to FIG. 11, illustrated therein is another exemplary screen 140 of the interface 30 which is used to provide the application data located by the search. The screen 140 includes information area 142 which includes the information provided in the input fields 122 by the user.

The screen 140 also includes an overview 146 of various results located by the search. The results may be filtered by corresponding applications by selecting one or more of the options 144 provided.

The screen 140 allows the user to take a preliminary look at the overview to determine whether further details of the result should be provided in a report. The user may review the results on a preliminary basis and select relevant results by checking on the corresponding checkboxes 148. Data associated with the selected results are provided in a more detailed report.

The detailed report may provide more detailed information about the results. The information contained in the detailed report may differ based on the application that the located application-specific data is associated with. For example, the detailed report for application-specific data related to an internet browser application may include location information about where on the data storage device 14 the data is located, URL information about various websites that had been visited using that browser application, titles of the websites visited, number of visits to each website, and information about when each website was most recently visited.

Figure 12:
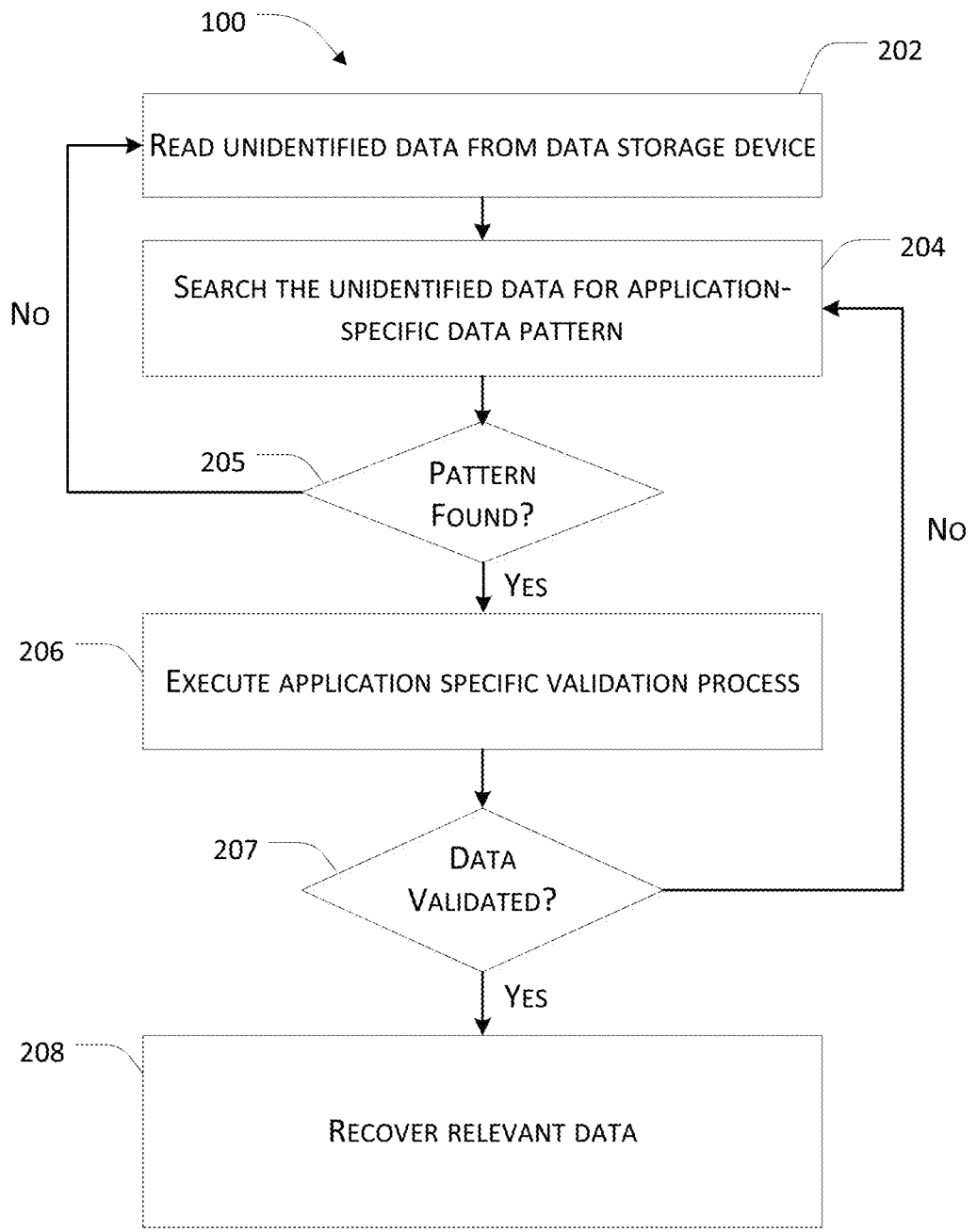
FIG. 12 is a flowchart illustrating a method for locating application-specific data according some embodiments.

A method 200 for locating application-specific data will now be explained with reference to FIGS. 12 and 13. FIG. 12 illustrates a flow chart including one or more steps of the method 200 for locating application-specific data. In some embodiments, the processor 12 may be configured execute one or more steps of the method 200 to locate application-specific data.

The method 200 starts a step 202 wherein a first portion of unidentified data from the data storage device 14 is read. The unidentified data may be any data that is stored in the data storage device 14. In some cases, the unidentified data may be data stored in sectors and/or other addresses marked as "unallocated". In some cases, the unidentified data may be accessed in four megabyte blocks. In some cases, each sector of the data storage device 14 may be parsed (i.e. read in a continuous flow instead of being read in blocks).

Figure 13:
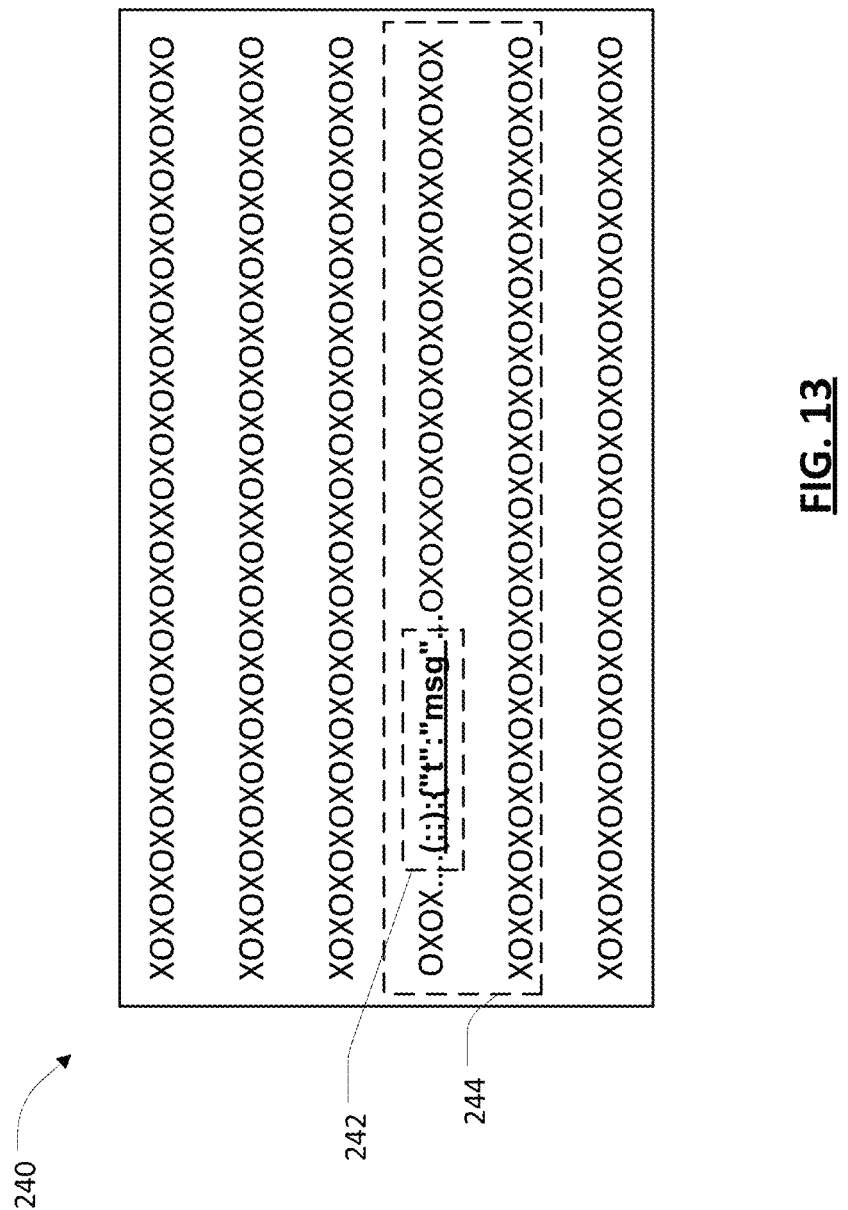
FIG. 13 is an exemplary data block that is being processed according to the method of FIG. 12.

Referring now to FIG. 13, illustrated therein is a schematic representation of a portion 240 of unidentified data. The unidentified data are generally indicated by X's and O's and other characters in the illustration.

At step 204, the portion of unidentified data, for example the portion 240, is examined to detect at least one application-specific data pattern associated with at least one application. The application-specific pattern may include a data pattern that is generally associated with a specific application. The application-specific data pattern, for example, may include headers normally associated with various applications. For example, the application-specific pattern for a chat application provided by Facebook Inc. may include the following underlined pattern: for (;;);{"t":"msq". This pattern is illustrated in FIG. 13 as pattern 242.

Each application-specific pattern maybe associated with one or more applications. In other cases, there may be other application-specific patterns, or other instances of the same application-specific pattern present in the block of data. Some other exemplary the application-specific data patterns may include the following underlined pattern associated with configuration files for a file sharing application provided by LimeWire: #LimeWire properties file. Another exemplary application-specific pattern is the following underlined pattern associated with configuration files for a webmail chat application provided by Yahoo! Inc.: <Ymsq Command="6". It should be noted that the above patterns are only provided herein for illustrative purposes.

It should also be noted that the application-specific data patterns included herein are only for illustrative purposes. There may be other application-specific data patterns associated with other applications. There may also be more than one application-specific data patterns associated with a single application.

For instance, in some cases, application-specific patterns may not necessarily be headers (i.e. data that is located in the front or the head of the data associated with an application). The application-specific patterns could be located in other parts of the data associated with the application. Generally, an application-specific pattern is somewhat distinctive in that the pattern, when found is often associated with one or more applications.

In some cases, application-specific patterns may include one or more user identifiers associated with one or more users of the application. The user identifiers may be obtained from the user or generated automatically as described hereinabove with reference to FIG. 4.

At step 105, a determination is made whether the portion of the unidentified data that is being examined in step 202 includes application-specific data pattern. If so, the method proceeds to step 206. However, if no application-specific data pattern is found, the method returns to step 202 wherein another portion of unidentified data may be read.

At step 206, the unidentified data which contains the application-specific data pattern is analysed to determine whether it includes valid data associated with an application. In particular, an application-specific validation process may be executed on a portion of the unidentified data located near that application-specific data pattern to determine whether that portion of unidentified data is valid data associated with the corresponding application. For example, the portion 244 shown in FIG. 13 may be examined when the pattern 242 is detected.

The selection of the portion to be examined may be based on the specific application. For example, if it is generally known that a particular application stores data at addresses that are given off-sets based on the location of the application-specific pattern, the portion of data that is being examined may include addresses at such offsets. In some cases, the entire block 240 may be examined.

The application-specific validation process that is being executed corresponds to the applications associated with the application-specific data pattern. For example, if the pattern 242, which is associated with Facebook Inc. Chat application, an application-specific process associated with Facebook Inc. Chat application will be executed. In some cases, if the application-specific pattern is associated with two or more applications, then more than one application-specific validation process may be executed to determine which (or neither) of those applications the application-specific data may be associated therewith. In some cases, a same application-specific validation process may be applicable to more than one application.

Some exemplary application-specific validation processes are described herein below.

In some cases, the application-specific validation process may include comparing the portion (e.g. the portion 244) of the unidentified data located near that application-specific data pattern against selected date ranges to filter out invalid data.

In some cases, the application-specific validation process may include determining how much of the portion (e.g. the portion 244) of the unidentified data includes unacceptable characters to determine whether that portion is valid data.

In some cases, a strictness level indicative of the tolerable amount of unacceptable characters in the portion of the identified data may be used to determine whether that portion of data is valid or invalid.

In some cases, the application-specific validation process includes checking for presence of data fields associated with the corresponding application in the portion of the unidentified data.

In some cases, the application-specific validation process may include checking whether the data fields contain non-readable characters to determine whether the portion of the unidentified data is valid or invalid.

In some cases, the application-specific validation process may include checking data surrounding the portion of the unidentified data to determine that that portion of data is not associated with another application.

In some cases, the application-specific validation process may include semantic error checking.

At step 207, if it is determined that the portion of the unidentified data is valid data (i.e. passes the application-specific validation process) associated with the corresponding application, then the method 200 proceeds to step 208. Alternatively, the method 200 returns to step 204 wherein the unidentified data may be searched for another application-specific data pattern.

At step 208, relevant data from the portion of data is recovered and noted as being associated with the corresponding application.

In some embodiments, some of the steps may be executed in parallel. Parallel execution of some steps may be particularly advantageous in systems that have more than one processor or a processor that has more than one processing core. In such cases, one or more cores may be focused on executing step 204 to search for application-specific data pattern and one or more other cores may be focused on validating data surrounding any located application-specific data pattern.

While the above description provides examples of one or more apparatus, systems and methods, it will be appreciated that other apparatus, systems and methods may be within the scope of the present description as interpreted by one of skill in the art.

The invention claimed is:

1. A system for locating application-specific data comprising:
   at least one data storage device, having unidentified data stored therein;
   at least one processor operatively coupled to the at least one data storage device, the at least one processor configured to:
   provide a user-definable strictness level indicative of a tolerable amount of unacceptable characters;
   access unidentified data from at least one data storage device, wherein the unidentified data is data stored in sectors or addresses of the at least one data storage device that are marked as unallocated;
   examine the unidentified data to detect a plurality of application-specific data patterns, each of the application-specific data patterns indicative of respective applications in a plurality of software applications;
   for each application-specific data pattern detected in the unidentified data, determine that said application-specific data pattern is associated with two or more applications and, in response to determining that said application-specific data pattern is associated with two or more applications, execute an application validation process specific for each of said associated two or more applications, wherein the at least one processor is further configured to execute each application-specific validation process by:
      determining an amount of unacceptable characters present in a portion of the unidentified data, the unacceptable characters being indicative of data that is not associated with any desired application; and
      determining that the portion of the unidentified data passes the application-specific validation process based upon the amount of unacceptable characters and the user-definable strictness level; and
   in response to determining that the unidentified data passes the application-specific validation process corresponding to the associated application, recover relevant data from the portion of data and associate said relevant data with the corresponding application.

2. The system of claim 1, wherein the unidentified data includes data that has been previously deleted.

3. The system of claim 1, wherein the at least one processor is configured to output the valid data to a second data storage device such that the valid data do not overwrite the unidentified data in the data storage device.

4. The system of claim 1, wherein the application-specific data pattern includes at least one user identifier for the at least one application, the user identifier being associated with at least one user of the data storage device.

5. The system of claim 1, wherein the at least one processor is further configured to execute the application-specific validation process by: determining whether data stored by the application is stored at address off-sets based on the location of the application-specific pattern.

6. The system of claim 1, wherein the unacceptable characters are null characters with a hexadecimal value of 0x00.

7. The system of claim 6, wherein determining whether the portion of the unidentified data is valid based upon the amount of unacceptable characters and the user-definable strictness level comprises determining whether a percentage of the unidentified data that is null characters is acceptable as determined by the user-definable strictness level.

8. The system of claim 1, wherein the at least one processor is further configured to provide a number of user-selectable options to select one or more applications to search and determine the search locations based upon the options selected.

9. The system of claim 1, further comprising a second data storage device configured to removably connect with the at least one processor and provide computer-executable instructions to configure the at least one processor.

10. A method of locating application-specific data, the method comprising:
provided a user-definable strictness level indicative of a tolerable amount of unacceptable characters;
accessing unidentified data from at least one data storage device, wherein the unidentified data is data stored in sectors or addresses of the at least one data storage device that are marked as unallocated;
examining the unidentified data to detect a plurality of application-specific data patterns, each of the application-specific data patterns indicative of respective applications in a plurality of software applications;
for each application-specific data pattern detected in the unidentified data, determining that said application-specific data pattern is associated with two or more applications and, in response to determining that said application-specific data pattern is associated with two or more applications, executing an application validation process specific for each of said associated two or more applications, wherein each application-specific validation process comprises:
determining an amount of unacceptable characters present in the portion of the unidentified data, the unacceptable characters being indicative of data that is not associated with any desired application; and
determining that the portion of the unidentified data passes the application-specific validation process based upon the amount of unacceptable characters and the user-definable strictness level; and
in response to determining that the unidentified data passes the application-specific validation process corresponding to the associated application, recovering relevant data from the portion of data and associating said relevant data with the corresponding application.

11. The method of claim 10, wherein the unidentified data includes data that has been previously deleted.

12. The method of claim 10, wherein the application-specific data pattern includes at least one user identifier for the at least one application, the user identifier being associated with at least one user of the data storage device.

13. The method of claim 10, wherein the at least one user identifier is obtained by searching the data storage device at specific locations, the locations being known to store user identifiers associated with the at least one application.

14. The method of claim 10, wherein the application-specific validation process includes determining whether data stored by the application is stored at address offsets based on the location of the application-specific pattern.

15. The method of claim 10, wherein the unacceptable characters are null characters with a hexadecimal value of 0x00.

16. The method of claim 15, wherein determining whether the portion of the unidentified data is valid based upon the amount of unacceptable characters and the user-definable strictness level comprises determining whether a percentage of the unidentified data that is null characters is acceptable as determined by the user-definable strictness level.

17. The method of claim 10, wherein the method further comprises providing a number of user-selectable options to select one or more applications to search, and the search locations are determined based upon the options selected.

18. A non-transitory computer-readable storage medium comprising instructions which when executed on a computer cause the computer to execute a method of locating application-specific data, the method comprising:
providing a user-definable strictness level indicative of a tolerable amount of unacceptable characters;
accessing unidentified data from at least one data storage device, wherein the unidentified data is data stored in sectors or addresses of the at least one data storage device that are marked as unallocated;
examining the unidentified data to detect a plurality of application-specific data patterns, each of the application-specific data patterns indicative of respective applications in a plurality of software applications;
for each application-specific data pattern detected in the unidentified data, determining that said application-specific data pattern is associated with two or more applications and, in response to determining that said application-specific data pattern is associated with two or more applications, executing an application validation process specific for each of said associated two or more applications, wherein each application-specific validation process comprises:
determining an amount of unacceptable characters present in the portion of the unidentified data, the unacceptable characters being indicative of data that is not associated with any desired application; and
determining that the portion of the unidentified data passes the application-specific validation process based upon the amount of unacceptable characters and the user-definable strictness level; and
in response to determining that the unidentified data passes the application-specific validation process corresponding to the associated application, recovering relevant data from the portion of data and associating said relevant data with the corresponding application.

* * * * *